W. L. CLEGG.
SWINGLETREE.
APPLICATION FILED SEPT. 10, 1912.
1,055,612.
Patented Mar. 11, 1913.
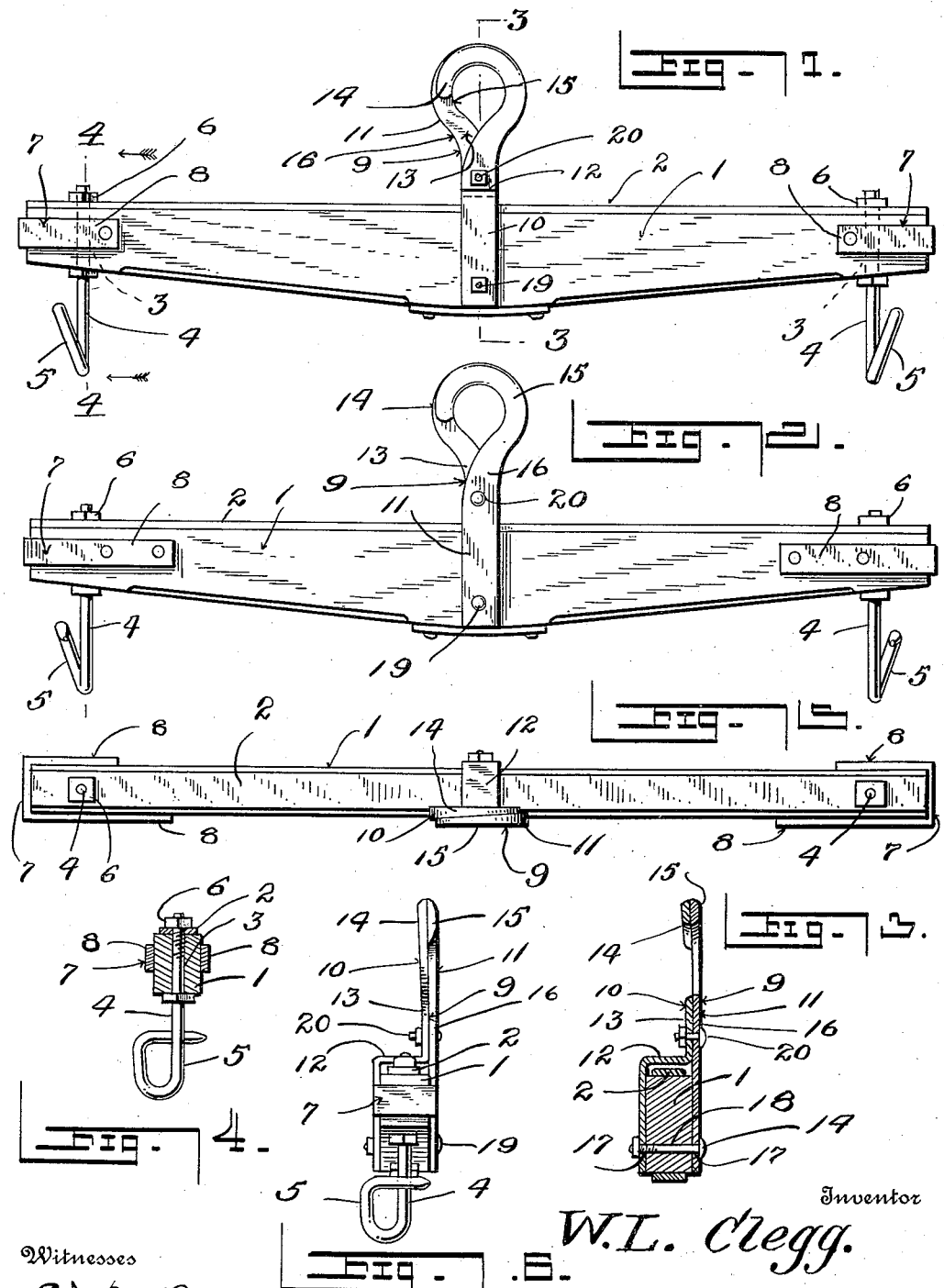

UNITED STATES PATENT OFFICE.

WILTON L. CLEGG, OF MONROE, GEORGIA.

SWINGLETREE.

1,055,612. Specification of Letters Patent. Patented Mar. 11, 1913.

Application filed September 10, 1912. Serial No. 719,620.

*To all whom it may concern:*

Be it known that I, WILTON L. CLEGG, a citizen of the United States, residing at Monroe, in the county of Walton, State of Georgia, have invented certain new and useful Improvements in Swingletrees; and I do hereby declare the following to be a full, clear, and exact description of the invention, such as will enable others skilled in the art to which it appertains to make and use the same.

The present invention is directed to improvements in swingle trees, and has for its object to provide a device of this character which is exceedingly simple in construction, efficient in operation, and one which may be manufactured at a minimum cost.

A further object of the invention is to produce a swingle tree so constructed that should any of its parts become broken or worn the same may be easily and conveniently replaced.

With these and other objects in view, this invention resides in the novel features of construction, formations, combinations and arrangements of parts to be hereinafter more fully described, claimed and illustrated in the accompanying drawing, in which:—

Figure 1 is a top plan view. Fig. 2 is a bottom plan view. Fig. 3 is a sectional view on line 3—3 of Fig. 1. Fig. 4 is a similar view on line 4—4 of Fig. 1. Fig. 5 is an edge view. Fig. 6 is an end view.

Referring to the drawing, the numeral 1 designates the body of a swingle tree, the same being formed from wood and has its rear edge provided with a metallic brace strip 2. Formed in each end of the body 1 is a perforation 3 and in which is mounted the shank 4 of a hook 5, said hook serving to retain the trace ends. The hooks 5 have their shanks threaded for engagement by the adjusting nuts 6, one of which being positioned upon opposite edges of the body so that the hook may be firmly clamped or readily removed when desired. Upon the ends of the body 1 are bolted U-shaped clips 7, the arms 8 of which engage the upper and lower surfaces of the body, thus bracing and strengthening the ends of the body.

A hook member 9 is provided and consists of sections 10 and 11, the top section 10 being provided intermediate its ends with a vertical portion 12 which terminates in a shank 13, said shank in turn terminating in a hook 14 which coacts with a hook 15 which is a continuation of the shank 16 of the lower section 11. The outer ends of the sections 10 and 11 are provided with perforations 17 which are adapted to register with a perforation 18 formed in the central portion of the body 1, whereby the bolt 19 may be passed through the perforations to secure the member 9 to the body.

The shanks 13 and 16 are pivotally connected by a pin 20, so that the hooks 14 and 15 may be spread apart upon removal of the bolt 19, whereupon the hooks may be engaged in the clevis of a plow, or may be connected to a double tree.

What is claimed is:—

A hook member for swingletrees consisting of upper and lower sections adapted to engage the upper and lower surfaces respectively of the body portion, the upper section terminating in a vertical portion, the lower end of which terminates in a shank, a hook carried by the shank, the lower section of the hook member being provided with a shank which terminates in a hook adapted to coact with the first named hook, said shanks being pivotally connected so that the hook may be spread apart, and means for connecting the sections to the swingle tree.

In testimony whereof, I affix my signature, in presence of two witnesses.

WILTON L. CLEGG.

Witnesses:
THOS. J. EDMONDS,
H. A. CLEGG.

Copies of this patent may be obtained for five cents each, by addressing the "Commissioner of Patents, Washington, D. C."